United States Patent [19]

Hori

[11] 4,318,068
[45] Mar. 2, 1982

[54] INDUCTION DEVICE EQUIPPED WITH VIBRATION SUPPRESSOR

[75] Inventor: Yasuro Hori, Katsuta, Japan
[73] Assignee: Hitachi, Ltd., Tokyo, Japan
[21] Appl. No.: 160,662
[22] Filed: Jun. 18, 1980
[30] Foreign Application Priority Data Jun. 22, 1979 [JP] Japan .................................. 54/78158

[51] Int. Cl.³ ............................................ H01F 15/00
[52] U.S. Cl. .................................... 336/100; 188/1 B
[58] Field of Search .................... 336/100; 310/51, 93; 188/1 B

[56] References Cited

U.S. PATENT DOCUMENTS 3,447,638  6/1969  Schilberg ........................... 188/1 B

FOREIGN PATENT DOCUMENTS 269749  8/1965  Australia ............................. 336/100
36-9132  4/1961  Japan ................................. 336/100
1078300  8/1967  United Kingdom ............... 336/100

*Primary Examiner*—Thomas J. Kozma
*Attorney, Agent, or Firm*—Craig and Antonelli

[57] ABSTRACT

A plurality of rod-like vibration elements are fixed onto the outer circumferential surface of the exterior wall of the tank of a transformer. Each rod-like vibration element consists of a beam portion extending in parallel to the outer circumferential surface of the exterior wall and a fitting portion having one end thereof fixed to the beam portion and the other fixed onto the outer circumferential surface of the exterior wall of the tank. The width D of the beam portion in the direction perpendicular to the outer circumferential surface of the exterior wall of the tank is selected to be greater than the width W of the beam portion in the direction at right angles to the width D.

10 Claims, 4 Drawing Figures

INDUCTION DEVICE EQUIPPED WITH VIBRATION SUPPRESSOR

BACKGROUND OF THE INVENTION

This invention relates to an improvement in an induction device equipped with a vibration suppressor.

An induction device such as a transformer, for example, generates vibration due to magnetic strain of silicon steel sheets forming the iron core and due to electromagnetic force resulting from leakage flux and emits vibration noise from the outer circumference of its tank. To suppress the generated vibration, there have been employed such methods as reducing the magnetic flux density of the iron core, disposing an electromagnetic shield on the tank to reduce the leakage flux, and applying a reinforcing material to the outer circumferential wall of the tank. However, none of these methods has provided really satisfactory vibration suppression effects.

Accordingly, there has been proposed an induction device in which a vibration suppressor is disposed outside the outer wall of the tank so as to absorb the outwardly emitted vibration noise. Such a device is disclosed in Japanese Utility Model Publication No. 9132/1961 published on Apr. 22, 1961. In the device disclosed in this prior art reference, a pin is fixed perpendicularly to the surface of the outer circumference of the exterior tank wall and the center of a disc-like vibration plate is fixed to this pin. The sound wave generated by the vibration plate in this device has a 180° phase difference from the sound wave generated by the exterior tank wall. The vibration noise is reduced when both sound waves interfere with each other.

However, the effect of preventing the noise is not satisfactory because the vibration of the vibration plate itself and the emission efficiency of the noise are great. In addition, since the vibration plate has a disc-like form, it is not free from the problem of a space requirement.

SUMMARY OF THE INVENTION

It is therefore an object of the present invention to provide an induction device equipped with a vibration suppressor having an excellent vibration suppression effect.

It is another object of the present invention to provide an induction device equipped with a vibration suppressor having a low noise emission efficiency.

It is still another object of the present invention to provide an induction device equipped with a vibration suppressor having a small space requirement.

The device of the present invention is characterized by including rod-like vibration elements, each consisting of a beam portion extending in parallel to the outer circumferential surface of the exterior tank wall and a fitting portion having one end thereof fixed to the beam portion and the other fixed to the outer circumferential surface of the exterior tank wall whereby the thickness D of the beam portion perpendicular to the outer circumferential surface of the exterior tank wall is greater than that thickness W of the beam portion in the direction at right angles to the thickness D.

DESCRIPTION OF THE PREFERRED EMBODIMENTS

Figure 1:
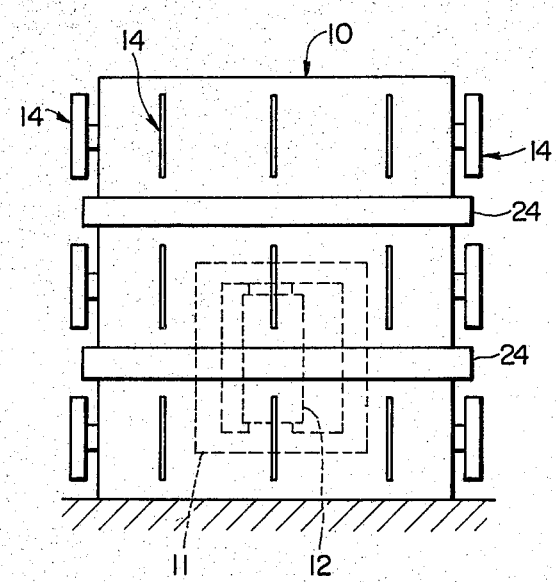
FIG. 1 is a front view showing an embodiment of the present invention.
Figure 2:
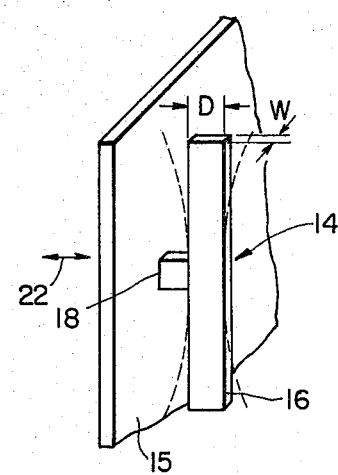
FIG. 2 is a perspective view showing in detail the vibration suppressor of FIG. 1 and FIGS. 3 and 4 are perspective views, each showing another embodiment of the present invention.

Referring to FIGS. 1 and 2, a magnetic iron core 11 and windings 12 wound onto the iron core are shown accommodated in a tank 10 of a transformer. A plurality of rod-like vibration elements 14 are fixed around the outer circumference of the exterior wall 13 of the tank 10. As shown in detail in FIG. 2, each vibration element 14 consists of a beam portion 16 extending in parallel to the outer circumferential surface 15 of the exterior wall 13 and a fitting portion 18 having its one end fixed at the center of the beam portion 16 and the other fixed to the outer circumferential surface of the exterior wall 13. The width D of the beam portion 16 in the direction perpendicular to the outer circumferential surface 15 of the exterior wall 13 of the beam portion (which is the same as the vibrating direction of the exterior wall 13 and is represented by reference numeral 22) is formed to be greater than the width W in the direction at right angles to the width D. These widths D and W are selected respectively in the ranges of from 100 to 200 mm and from 10 to 20 mm, for example.

During the operation of the transformer, the exterior wall 13 of the tank 10 vibrates in the direction represented by reference numeral 22. Accordingly, the beam portion 16, which is supported at the center by the fitting portion 18, vibrates as indicated by dotted line in FIG. 2 and thereby exhibits the vibration absorbing action. In other words, the vibration energy of the exterior wall of the tank is consumed by the plural rod-like vibration elements 14 and the vibration noise is thus reduced. The emission efficiency of the vibration noise is proportional to the square of the width W in the direction at right angles to the vibrating direction 22. In the present invention, a small value is selected for the width W so that the noise emission efficiency is low and the noise emitted by the vibration suppressor itself is suppressed. In the present invention, further, the space requirement of the vibration suppressor becomes small because its width W is small.

Since the beam portions 16 are symmetric to one another, no rotational moment is generated. Hence, it is possible to obtain vibration- and noise-suppression effects.

Figure 3:
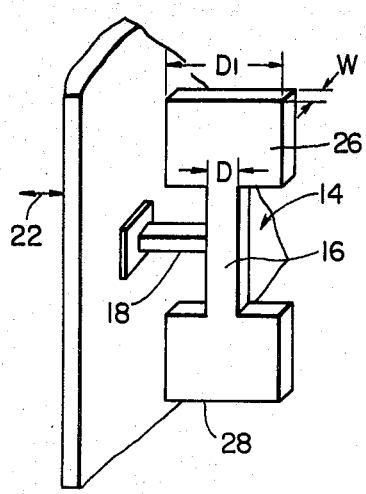

FIG. 3 shows another embodiment of the present invention, in which the width $D_1$ of each end portion 26, 28 of the beam portion 16 of the rod-like vibration element 14 in the vibrating direction is made greater than the width D at the center of the beam portion 16. This arrangement makes it possible to obtain the same characteristic frequency even when the length of the beam portion 16 is reduced, and thus to reduce the size of the vibration suppressor. Also, in this embodiment, the fitting portion 18 has a plate-like member at the end thereof for fixed connection with the exterior wall of the tank.

Figure 4:
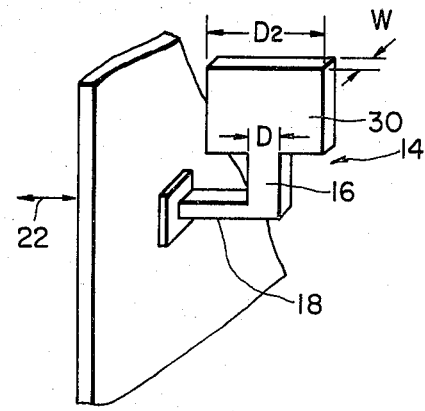

FIG. 4 shows still another embodiment of the present invention, in which the rod-like vibration element is of a cantilever beam type and the thickness $D_2$ of the upper end portion 30 in the vibrating direction is made greater than the thickness D at the center of the beam.

What is claimed is:

1. An induction device equipped with a vibration suppressor, comprising: a tank accommodating therein an inductor including a magnetic iron core and windings wound onto said magnetic core; and rod-like vibration elements, each including a beam portion extending in parallel to the outer circumferential surface of the exterior wall of said tank and a fitting portion having one end thereof stationarily fixed to said beam portion and the other end stationarily fixed to the outer circumferential surface of the exterior wall of said tank so that no relative movement occurs between the one end of said fitting portion and said beam portion at the fixed connection thereof and no relative movement occurs between the other end of said fitting portion and the outer circumferential surface of the exterior wall of said tank at the fixed connection thereof, said beam portion being spaced from the exterior wall of said tank solely by the fitting portion; the width D of said beam portion in the direction perpendicular to the outer circumferential surface of the exterior wall of said tank being greater than the width W of said beam portion in the direction at right angles to both the width D and the length of said beam portion.

2. The induction device equipped with a vibration suppressor as defined in claim 1, wherein said one end of said fitting portion is stationarily fixed substantially at the center of said beam portion of said rod-like vibration element.

3. The induction device equipped with a vibration suppressor as defined in claim 1, wherein the width of both tip portions of said rod-like vibration element in the vibrating direction is greater than the width at the center of said rod-like vibration element.

4. The induction device equipped with a vibration suppressor as defined in claim 1, wherein said beam portion vibrates in a direction perpendicular to the outer circumferential surface of the exterior wall of said tank, said beam portion including at least one section of rectangular shape having the length thereof extending in a direction parallel to the outer circumferential surface of the exterior wall of said tank.

5. The induction device equipped with a vibration suppressor as defined in claim 4, wherein said beam portion further includes an end section adjoining one end of said one rectangular section and having a width greater than the width of said one rectangular section in the vibrating direction.

6. The induction device equipped with a vibration suppressor as defined in claim 5, wherein said fitting portion has said end stationarily fixed to said one rectangular section fixed proximate to the other end of said one rectangular section so that said vibration element is a cantilever member.

7. The induction device equipped with a vibration suppressor as defined in claim 4, wherein said beam portion further includes two end sections, each end section adjoining respective ends of said one rectangular section and having a width greater than the width of said one rectangular section in the vibrating direction.

8. The induction device equipped with a vibration suppressor as defined in claim 7, wherein said fitting portion has said one end stationarily fixed to said one rectangular section substantially at the center of said one rectangular section.

9. The induction device equipped with a vibration suppressor as defined in claim 1, wherein said fitting portion rigidly interconnects the outer circumferential surface of the exterior wall of said tank and said beam portion whereby vibration and noise emanating from the wall of said tank are suppressed.

10. The induction device equipped with a vibration suppressor as defined in claim 1, wherein said fitting portion includes a plate-like member at the other end thereof for fixed connection with the exterior wall of said tank.

* * * * *